May 17, 1932.　　　　M. COOPER　　　　1,858,322
ROTARY COMBUSTION ENGINE
Filed Dec. 30, 1927　　　4 Sheets-Sheet 1

Fig. I.

Martin Cooper,
INVENTOR.

Witnesses
C. E. Churchman Jr.
Geo. H. Parks.

BY
Irving L. McCathran
ATTORNEYS.

May 17, 1932.                M. COOPER                1,858,322
                      ROTARY COMBUSTION ENGINE
                  Filed Dec. 30, 1927      4 Sheets-Sheet 2

Martin Cooper,
                INVENTOR.

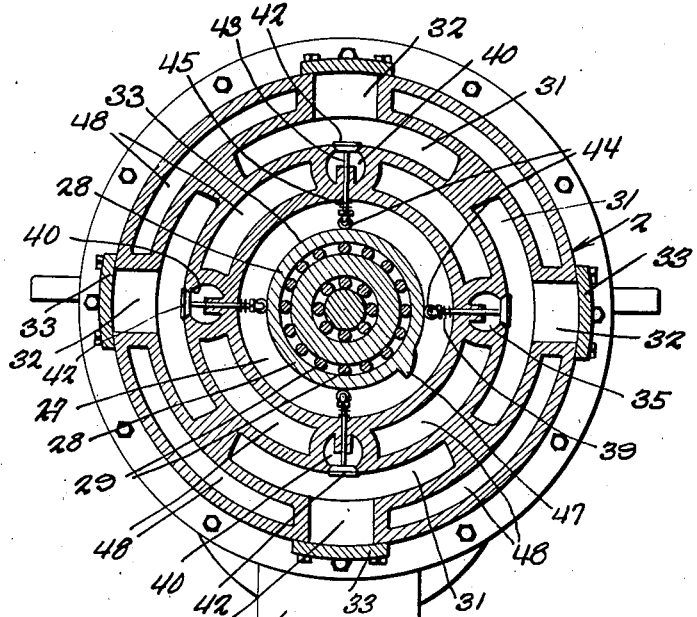
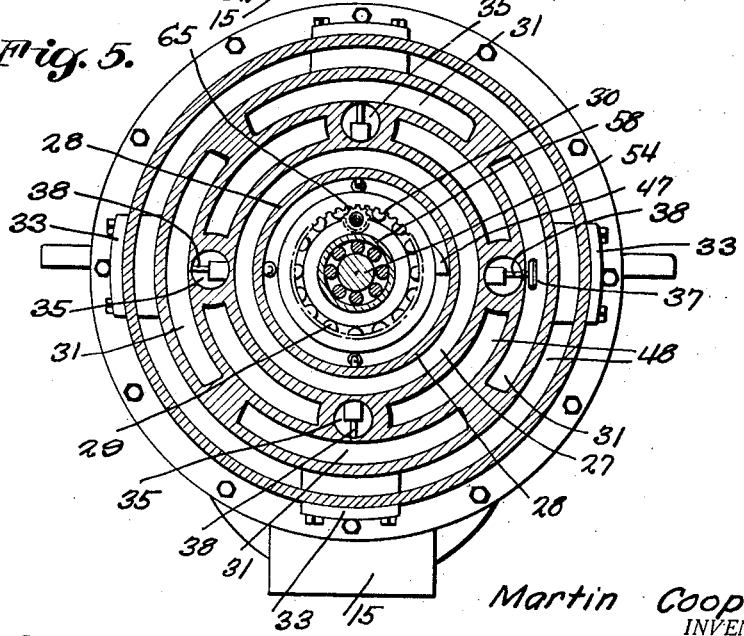

May 17, 1932.　　　M. COOPER　　　1,858,322
ROTARY COMBUSTION ENGINE
Filed Dec. 30, 1927　　4 Sheets-Sheet 4

Witnesses
C. E. Churchman Jr.
Geo. H. Forbes

Martin Cooper,
INVENTOR.

BY
Irving L. M. Cathran
ATTORNEYS.

Patented May 17, 1932

1,858,322

UNITED STATES PATENT OFFICE

MARTIN COOPER, OF THOMASVILLE, NORTH CAROLINA

ROTARY COMBUSTION ENGINE

Application filed December 30, 1927. Serial No. 243,658.

This invention relates to a rotary engine of the combustion type having for its primary object the provision of an engine of this type wherein the force of a series of explosions will be directed against a rotary element in such a manner as to actuate the engine after the manner of a turbine.

The present invention is an improvement upon the structure shown in my previous Patent No. 1,714,549, dated May 28, 1929, and relating to a combustion turbine.

Another object of the invention is to provide an engine of the type wherein power impulses will be impressed against an inclined surface of a rotary element to actuate the same and wherein the said rotary element will act to expel gases, resulting from the burning of the engine fuel, from the engine.

The invention broadly comprises a rotor in the form of a cylinder in which a screw is formed, the screw having supporting stub shafts projecting from the longitudinal center at each end and the entire structure being housed in a casing chambered to provide a water jacket. At one end of the casing is an exhaust housing which covers the end of the casing and receives and conveys from the casing the exhaust gases from the engine. At the other end of the casing is a valve and timer housing in the central portion of which the other stub shaft of the screw is mounted and this last mentioned housing contains a plurality of cam-operated valves controlling a series of combustion chambers, each of which chambers opens into the adjacent end of the rotor casing so that at the proper intervals, gases under the pressure formed through their ignition, are discharged against the blades of the screw causing the same to rotate as a result of the impact of the discharging gases thereagainst. The rotation of the screw acts to remove the exhaust gases from the casing and discharge the same into the exhaust housing to be conveyed away from the engine.

The invention will be best understood from a consideration of the following detailed description taken in connection with the accompanying drawings forming a part of the present specification, with the understanding, however, that the invention is not confined to any strict conformity with the showing of the drawings, but may be changed or modified so long as such changes or modifications mark no material departure from the salient features of the invention as expressed in the appended claim.

In the accompanying drawings:—

Figure 4 is a section taken upon the line 4—4 of Fig. 1.

Figure 5 is a section taken upon the line 5—5 of Fig. 1.

Figure 1:
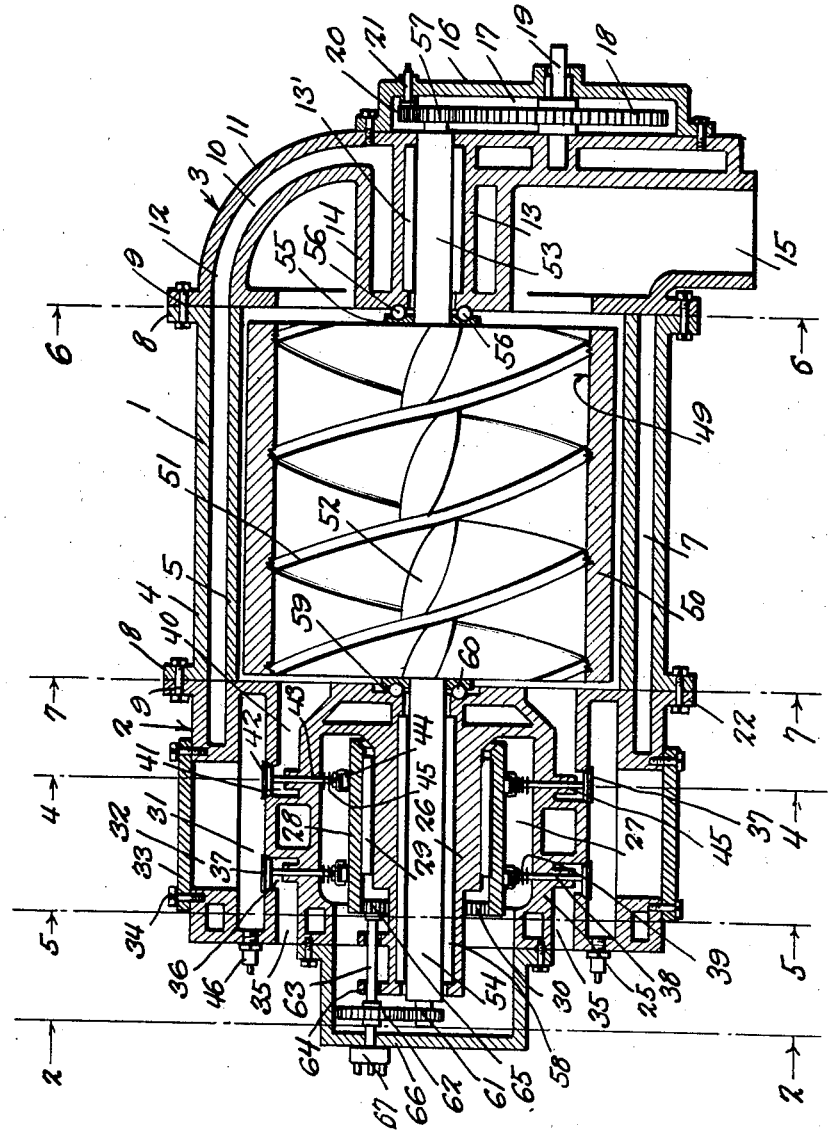
Figure 1 is a central longitudinal section of the engine embodying the present invention.
Figure 2:
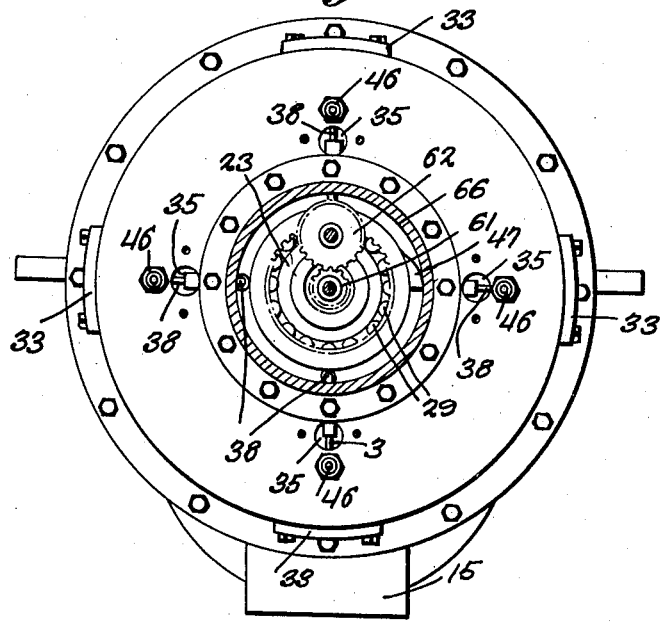
Figure 2 is a section taken upon the line 2—2 of Fig. 1.
Figure 3:
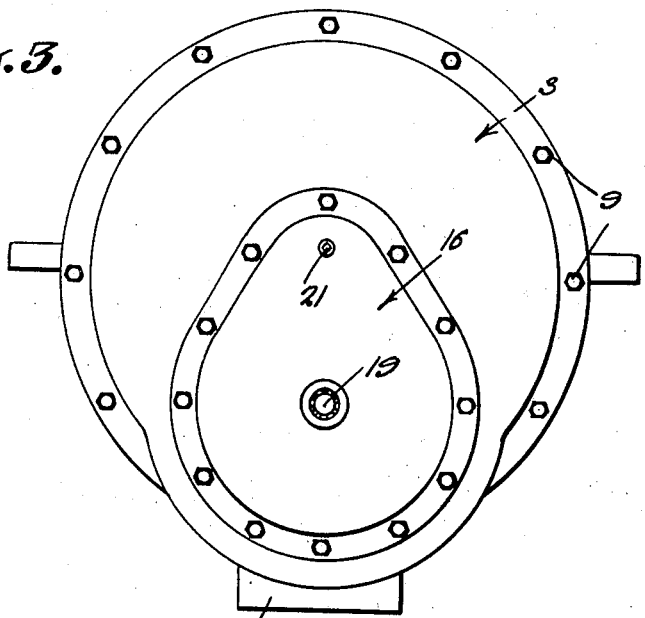
Figure 3 is an end elevational view of the engine taken from the exhaust end thereof.
Figure 6:
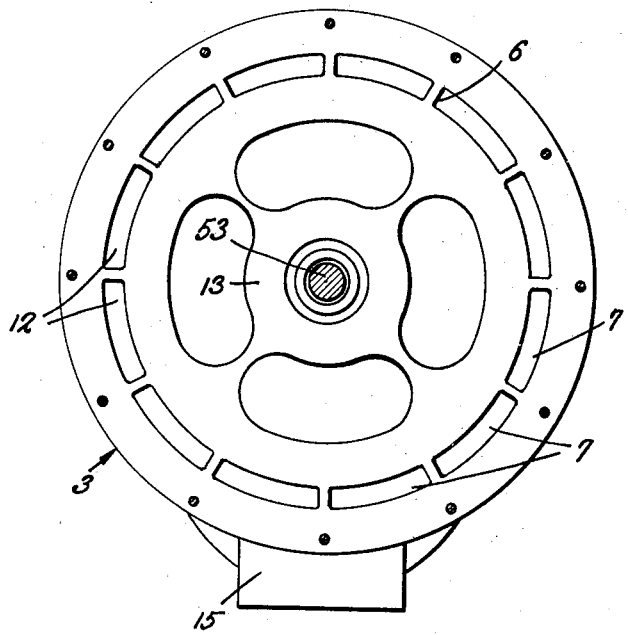
Figure 6 is a section taken upon the line 6—6 of Fig. 1.
Figure 7:
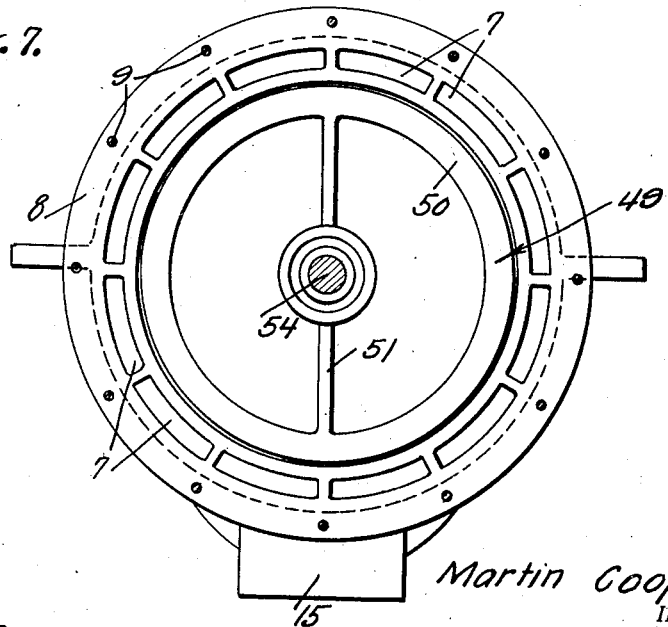
Figure 7 is a section taken upon the line 7—7 of Fig. 1.

Referring now more particularly to the drawings, wherein like numerals of reference indicate like parts throughout, the numerals 1, 2 and 3 indicate respectively the rotor housing, the valve and timer mechanism housing and exhaust housing.

The rotor housing is of elongated cylindrical form as shown and is double walled as indicated by the numerals 4 and 5, these walls being held in spaced relation by the partitions 6 setting up therebetween the water chamber 7. At each end this housing is provided with the surrounding laterally projecting flanges 8 which are apertured to receive securing bolts 9 which hold the valve and primer housing and the exhaust housing securely against the ends of the rotor housing as will be hereinafter more clearly described.

The exhaust housing 3 is a dish-like body having the spaced inner and outer walls 10 and 11 respectively which walls are held in spaced relation to form a water chamber 12 which opens around the rim of the body for coaction with a chamber 7. The central portion of the housing 3 has the inwardly projecting hub body 13 which is also surrounded by an inner wall 14 which is formed integral with the inner wall 10 to provide a water space around the hub. Mounted within the hub body 13 are roller bearings 13' which support the engine rotor shaft as will be hereinafter described. An outlet pipe 15 communicates with the housing 3 to carry off the combustion from the engine.

Secured to the outer wall of the housing 3 is a cover shell 16 forming a gear casing 17 against the housing wall in which is located the large gear 18 having the stub shaft 19 thereof mounted in bearings formed in the walls on either side thereof and a pinion gear 20 located above the gear 18 and having the supporting shaft 21 projecting through the wall of the casing 16 and formed to receive a crank or other device suitable for rotating this gear for the purpose of imparting motion to the engine when starting the same.

The valve and timer mechanism housing 2 is of cylindrical formation like the rotor housing 1 and is of substantially the same overall diameter as the rotor housing. This housing 2 is provided at one end with the surrounding laterally projecting flange 22 which abuts the flange 8 at the other end of the rotor housing and is secured thereto by a series of bolts 9.

The rotor housing 2 is provided with a central hub 23 having at the inner end the disk-like portion 24 which merges with the inner edge of the shell 25, which shell surrounds and is spaced from the hub 23 as is clearly shown in Fig. 1. As is also shown, the hub projects a substantial distance beyond one face of the housing body 2 and the inner portion of the hub is of decreased thickness or in other words, of slighter circumference than the projecting outer portion, this thickened portion being indicated by the numeral 26. There is thus formed about the hub 23 the chamber 27 in which is housed a cam sleeve 28 which surrounds the portion 26 of the hub and is supported thereon by the roller bearing element 29. As shown, this sleeve 28 is of substantially half the length of the head of the hub 23 and the outer end of the sleeve is provided with the internal gear 30 for the purpose to be hereinafter described.

The body of the housing 2 is provided with a series of circumferentially extending chambers 31 which constitute explosion combustion chambers. Each of these chambers 31 has communicating therewith a radially directed passage 32 which opens through the periphery of the housing 2, as clearly shown in Fig. 4 and is covered at its outer end by the removable plate 33, this plate being secured to the housing 2 by means of the screw members 34, or other appropriate devices.

Extending from the outer face of the housing 2 are fuel inlet passages 35 and these passages communicate with the chambers 31 by means of ports 36. Poppet inlet valves 37 are provided for the ports 36 and the stems 38 thereof extend radially into the chamber 27. The inner ends of the stems carry anti-friction rollers for engaging the sleeve 28. Coil springs 39 are placed about the stems 38 and normally hold the valves on their seats. Suitable outlet passages 40 are formed in the casing 2 and communicate with the rotor casing 1. The chambers 31 communicate with the passages 40 by means of ports which are controlled by outlet valves 42. The stems 43 of the outlet valves extend into the chamber 27 and carry rollers 44 for engaging the cam sleeve 28. Springs 45 are placed about the valve stems and function to normally hold the valves 42 on their seats. The chambers 31 receive suitable spark plugs 46, the current supplied to these plugs being controlled in the manner hereinafter described.

The body 28 is provided with appropriate cam surfaces 47 which, when the body rotates passes under the valve rollers 38 and 44 to open the valves as required.

The housing 2 is provided with the chambers 48 on opposite sides of the combustion chambers 31 in which water is housed so as to form a water jacket about the said combustion chamber.

Within the rotor housing 1 is a rotor indicated as a whole by the numeral 49. As shown, this rotor comprises a cylinder 50 open at each end and having arranged therein and extending throughout the length thereof a screw or worm 51, a shaft 52 extending through the center of this worm and positioned from each end thereof for setting up the supporting end portions 53 and 54. The shaft end 53 extends into the hub 13 and is supported therein upon the roller bearings 13'. Adjacent the inner end of the shaft end section 53 is positioned a bearing plate 55 between which and the adjacent end of the hub 13 the anti-friction rollers or balls 56 are positioned. The outer end of the shaft section 53 carries a pinion gear 57 which meshes with and between the gears 18 and 20. The opposite end section 54 of the shaft 52 projects through the hub 23 being supported therein upon the roller bearings 58. At the inner end of this section 54 is positioned a bearing plate 59 between the outer face of which and the inner face of the adjacent hub portion 24 are arranged the anti-friction balls 60. The free end of the shaft section 54 carries a gear 61 which meshes with a gear 62 mounted upon the shaft 63, this shaft being supported in the bearings 64 which are carried upon the outer end of the hub body 23. The inner end of the shaft 63 carries the pinion gear 65 which gear is in mesh with the ring gear 30 found upon the inner face of the cam body 28. A shell or casing 66 overlies the outer end of the shaft section 64 and the gears 61 and 62 and is secured to the adjacent face of the valve and timer housing 2. The outer end of the shaft 63 carries the commutator 67 from which appropriate wires (not shown) lead to the plugs 46. The timing of the firing of the plugs is thus controlled by the shaft 52 rotating the shaft 63 and in this manner the closing of the valves is also controlled.

The present engine is designed to have the fuel charges injected into the passages 35 in any desired way and when in operation the cam 47 successively opens the valves 37 to admit charges of fuel to the chambers 31. Upon explosion of the fuel in each chamber, the valve 42 will be opened to permit the force of the explosion to pass through the passage 40 for discharge against the inclined surface of the rotor screw 51, the force of this discharge against the screw causing the rotation of the same. Successive discharges from the passages 40 will continue the rotation of the rotor, the power generated thereby being taken off from the stub shaft 19. It will be seen that the construction of the rotor is such that the products of combustion will impinge against the screw and discharge through the exhaust passage 15.

Having thus described my invention, what I claim is:—

A combustion engine comprising a housing, a rotor within the housing, a shaft projecting from the longitudinal center of the rotor at each end thereof, an exhaust housing secured to one end of the rotor housing having means for rotatably supporting one end of the shaft of the rotor, a valve housing secured to the opposite end of the rotor housing, a hub in the valve housing for supporting the other end of the rotor shaft, the valve housing having a series of radially disposed combustion chambers surrounding the same, said chambers each having intake and discharge passages, the discharge passages opening into the rotor housing toward the adjacent end of said rotor, intake and exhaust control valves in each of said combustion chambers for controlling the flow of the intake and exhaust gases from said chamber, said valve housing provided with radially directed passages located for direct communication with said valves whereby direct access may be had to said valves from the outside of said valve housing, removable plates normally closing said radially directed passages, a rotary cam sleeve in said valve housing secured to the adjacent end of the rotor shaft for rotation therewith, inwardly extending radially disposed stems for said valves slidably supported by the valve housing, antifriction rollers carried by the inner ends of the stems for engaging the cam sleeve, the outer face of said cam sleeve being comparatively straight from edge to edge, firing plugs associated with said combustion chambers, a timer for the firing plugs, a ring gear on said rotary cam sleeve, means for driving the ring gear and the timer, and a shell removably secured to the outer end of said valve housing for permitting access to the inner ends of said valves from the outer end of said valve housing.

In testimony whereof I affix my signature.

MARTIN COOPER.